United States Patent [19]

Suzuki

[11] Patent Number: 5,157,643
[45] Date of Patent: Oct. 20, 1992

[54] AUTOMATIC TUNE SELECTION AND PLAYBACK APPARATUS

[75] Inventor: Tsutomu Suzuki, Saitama, Japan

[73] Assignee: Pioneer Electronic Corporation, Tokyo, Japan

[21] Appl. No.: 366,896

[22] Filed: Jun. 15, 1989

[30] Foreign Application Priority Data

| Nov. 18, 1988 | [JP] | Japan | 63-292942 |
| Nov. 18, 1988 | [JP] | Japan | 63-292943 |
| Nov. 18, 1988 | [JP] | Japan | 63-292944 |
| Nov. 18, 1988 | [JP] | Japan | 63-292945 |
| Nov. 18, 1988 | [JP] | Japan | 63-292946 |
| Dec. 28, 1988 | [JP] | Japan | 63-334565 |

[51] Int. Cl.$^5$ .................... G11B 21/08; G11B 31/00
[52] U.S. Cl. ............................... 369/33; 369/32; 369/34
[58] Field of Search ............. 369/30, 32, 33, 34; 358/341, 342; 340/706; 235/381

[56] References Cited

U.S. PATENT DOCUMENTS

| 4,647,989 | 3/1987 | Geddes | 369/34 X |
| 4,740,938 | 4/1988 | Bierhoff et al. | 369/30 X |
| 4,766,581 | 8/1988 | Korn et al. | 369/30 |

FOREIGN PATENT DOCUMENTS

| 0265167 | 4/1988 | European Pat. Off. | 369/34 |
| 8601326 | 2/1986 | PCT Int'l Appl. | 369/34 |
| 1320521 | 6/1973 | United Kingdom | 369/33 |
| 2092354 | 8/1982 | United Kingdom | 369/33 |

Primary Examiner—Bentsu Ro
Attorney, Agent, or Firm—Sughrue, Mion, Zinn, Macpeak & Seas

[57] ABSTRACT

An automatic tune-selection and playback apparatus including a playback for supporting a storage medium in which a plurality of tunes are stored, and for selecting a specified tune in accordance with the tune-specifying information to playback the selected tune, a plurality of terminal units each of which receives and stores the tune-specifying information, and a central control unit for sequentially reading the tune-specifying information from each of the terminal units as data specific to that terminal so as to supply the playback with the tune-specifying information. Thus, the automatic tune selection and playback apparatus is capable of efficiently accepting large amounts of request tunes.

9 Claims, 15 Drawing Sheets

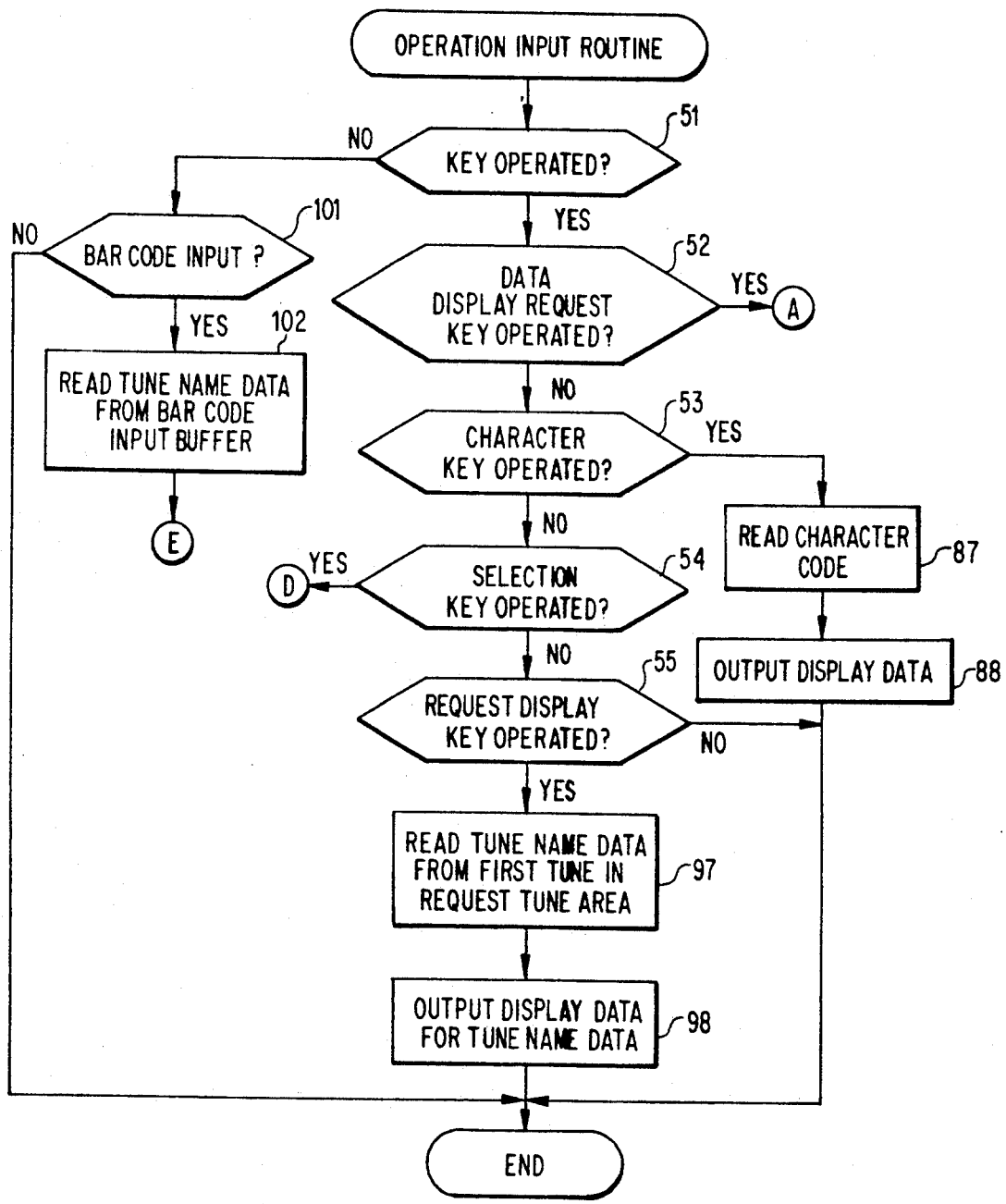

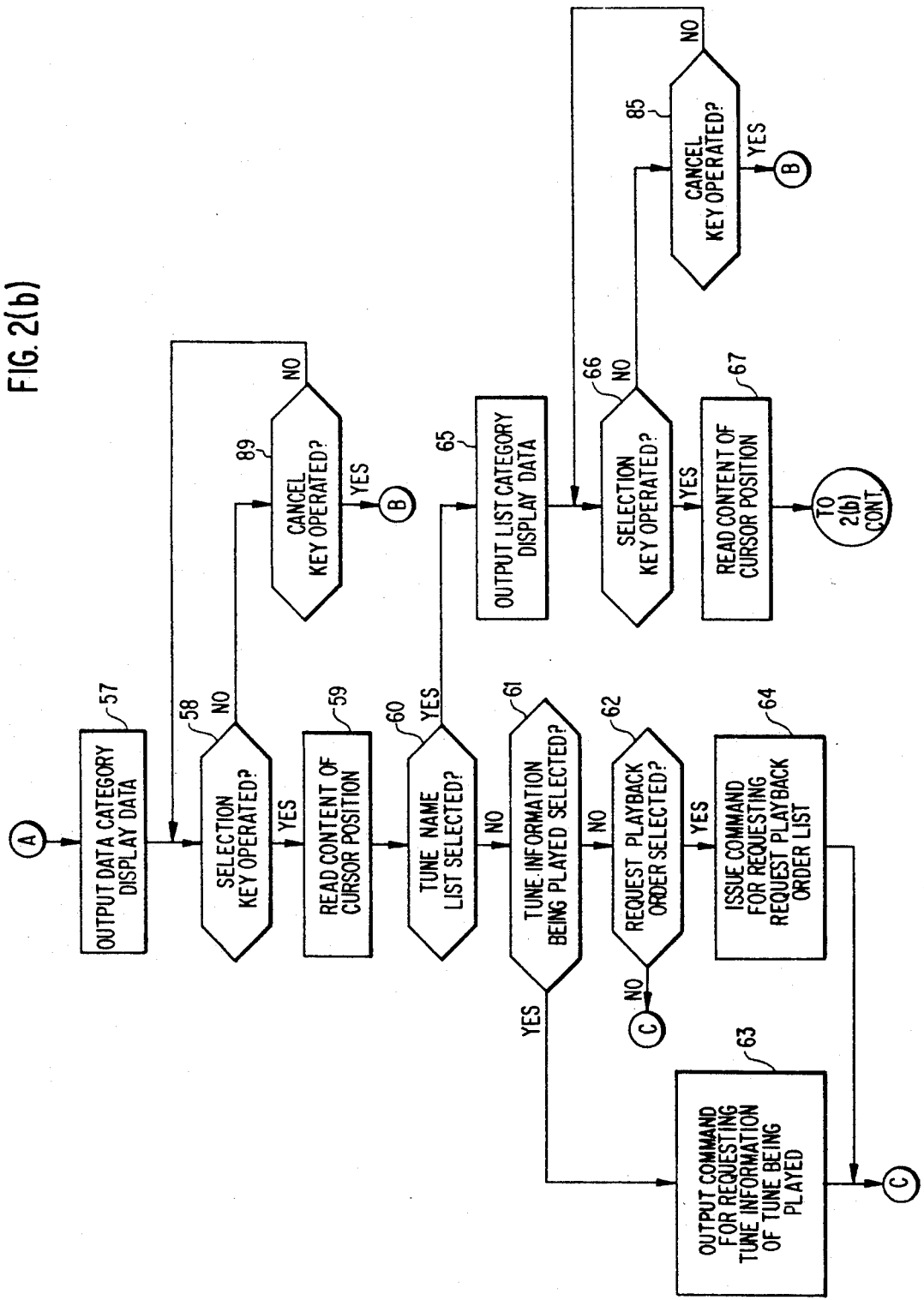

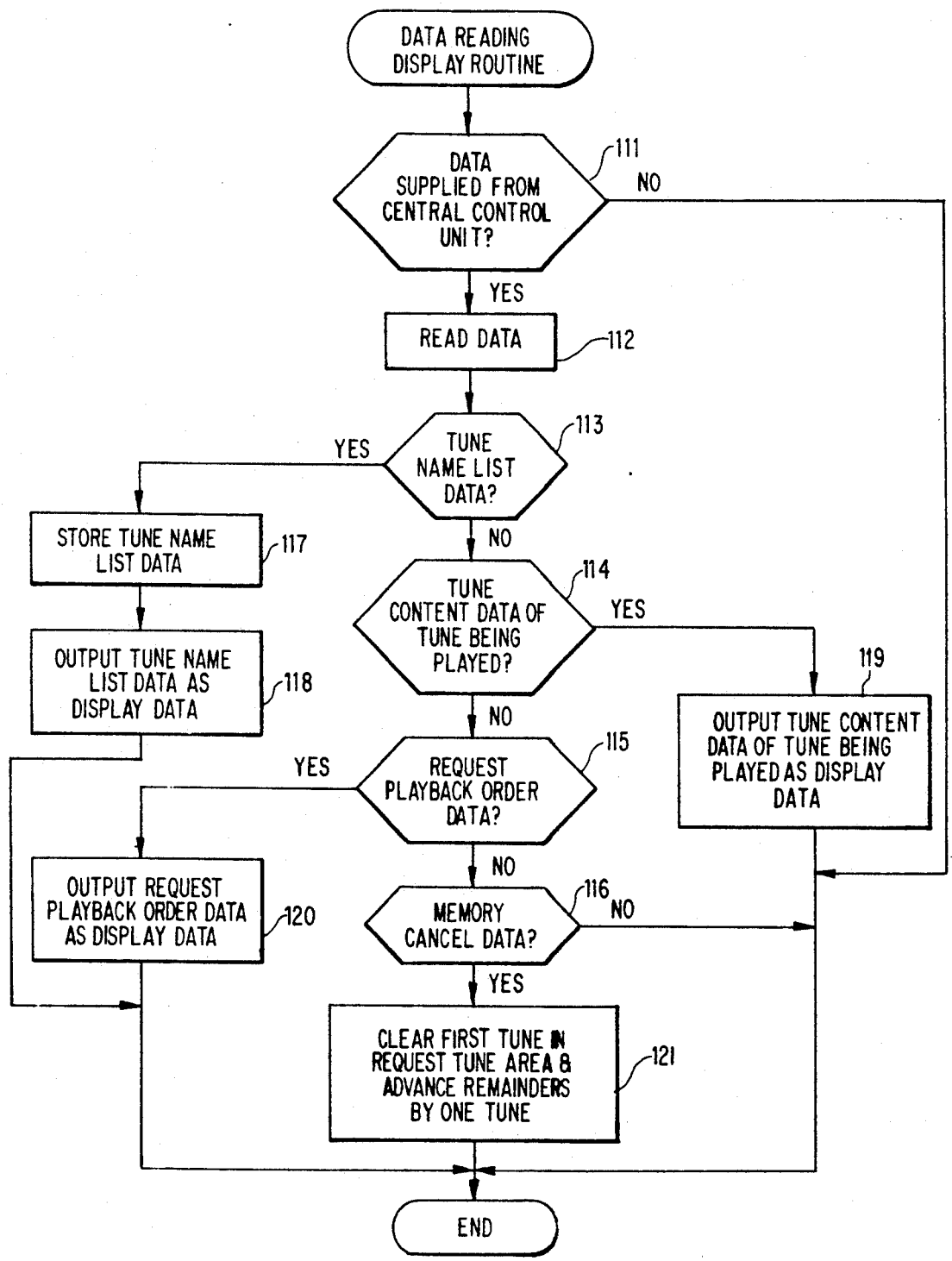

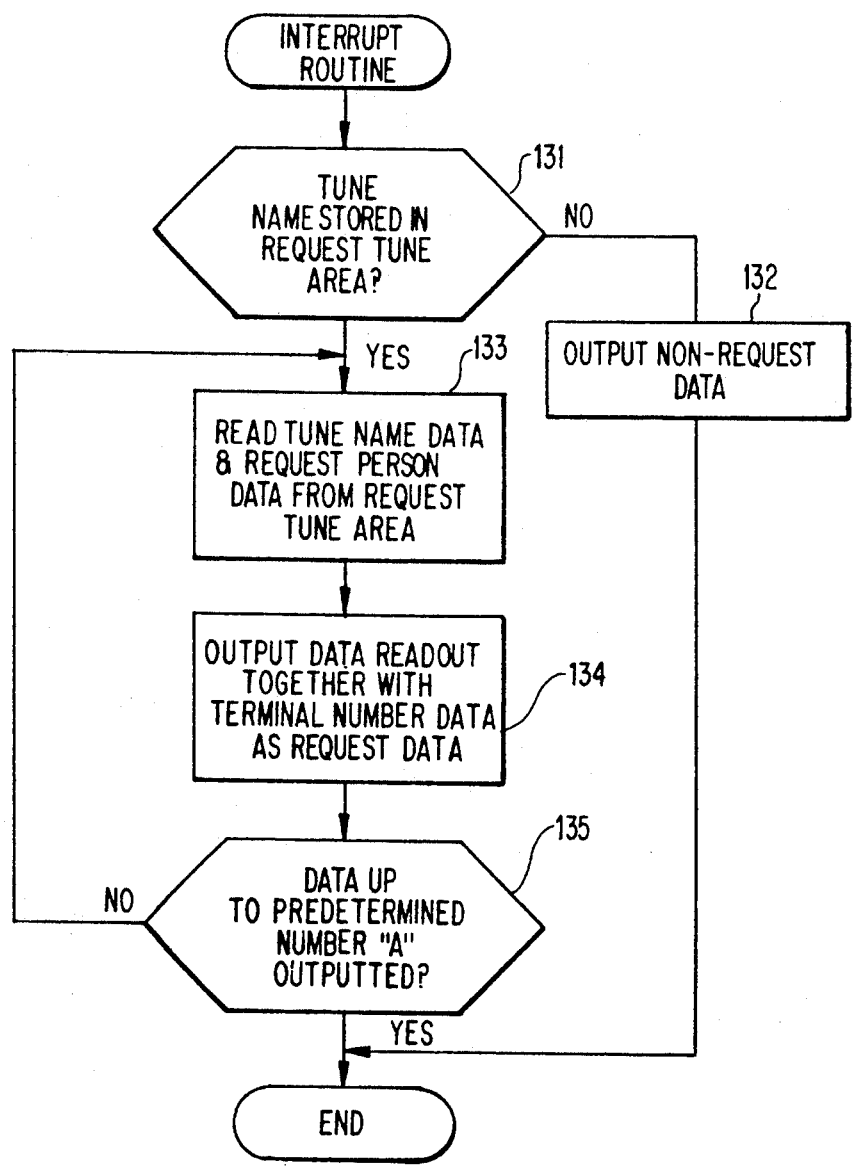

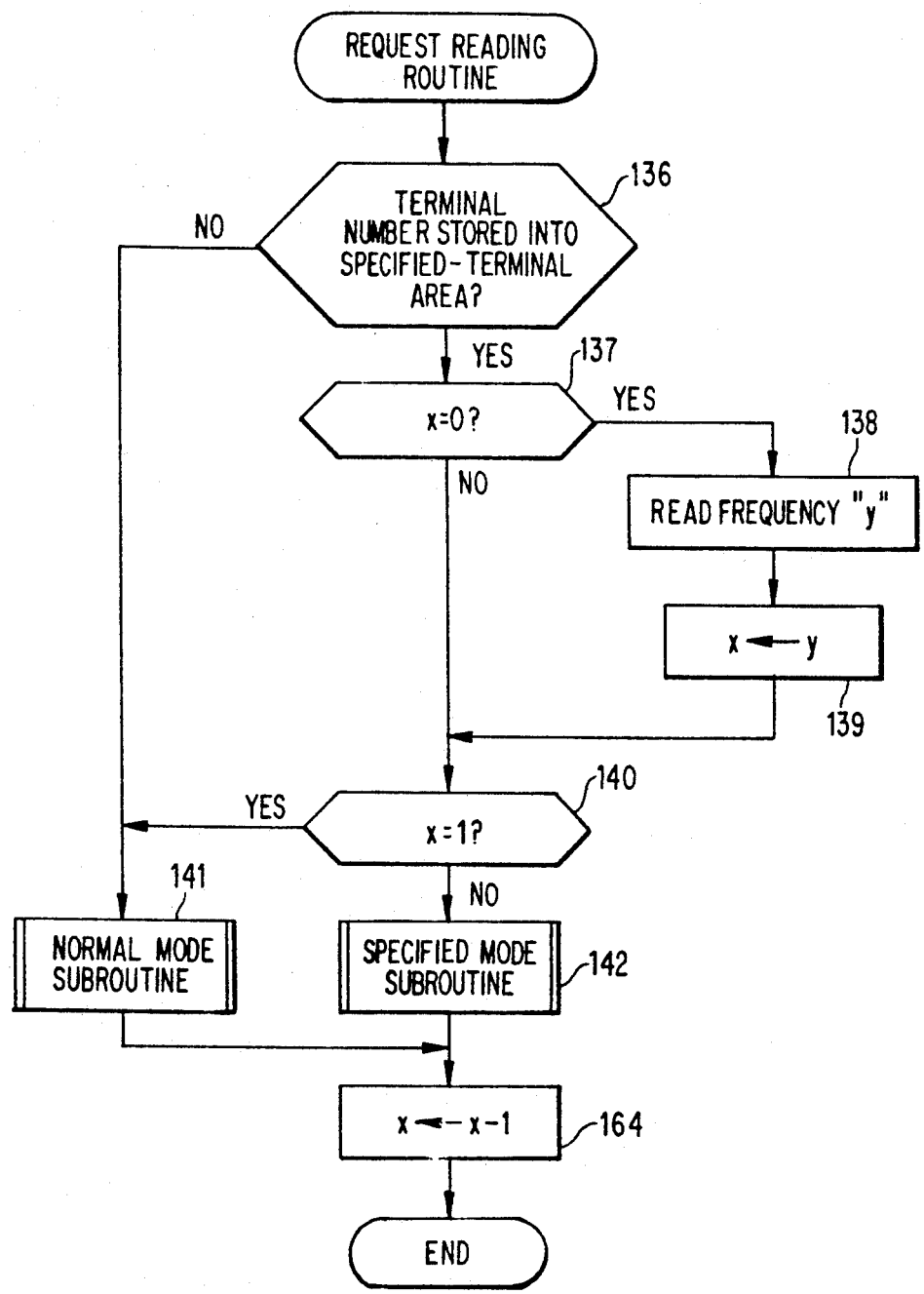

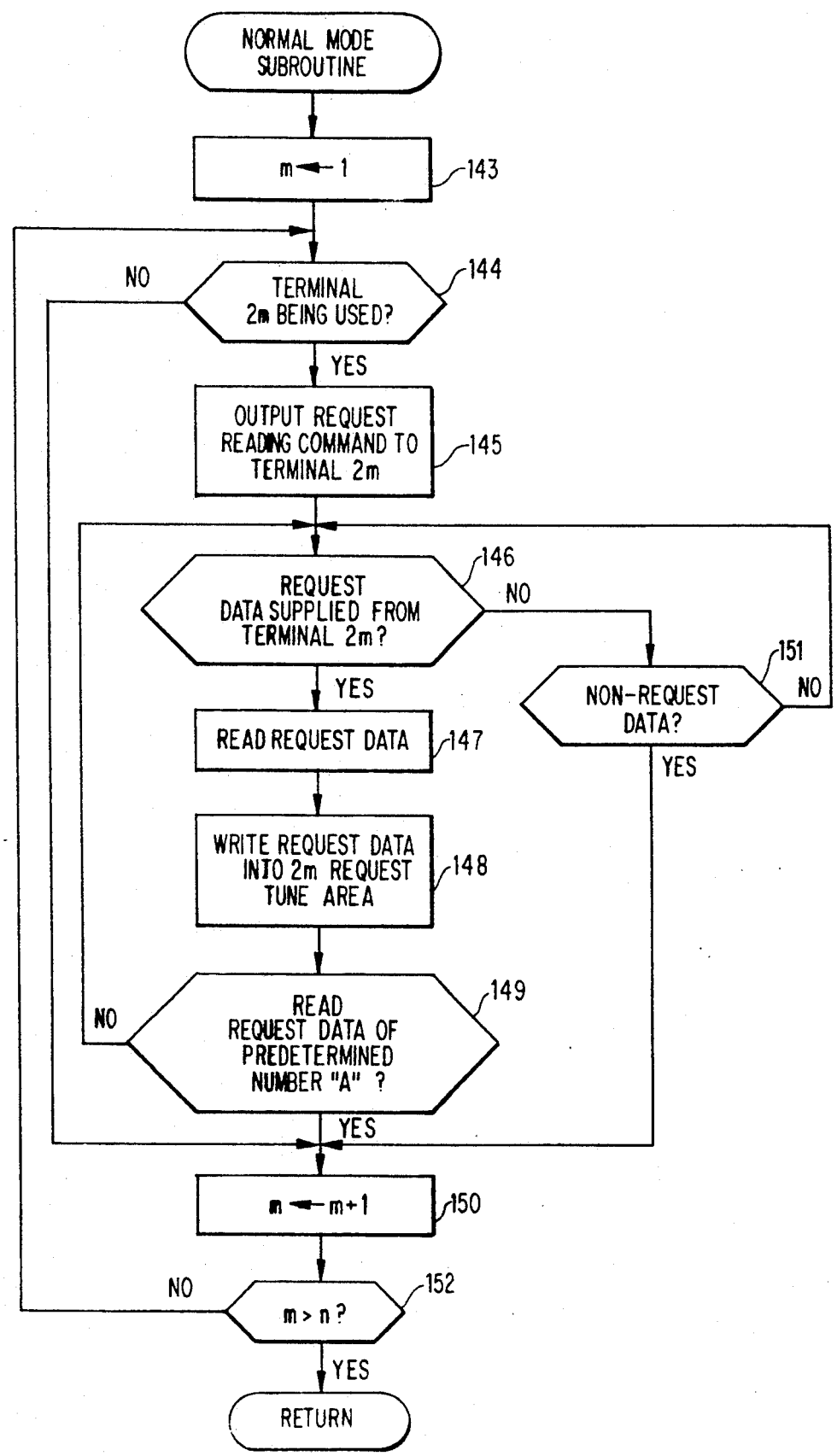

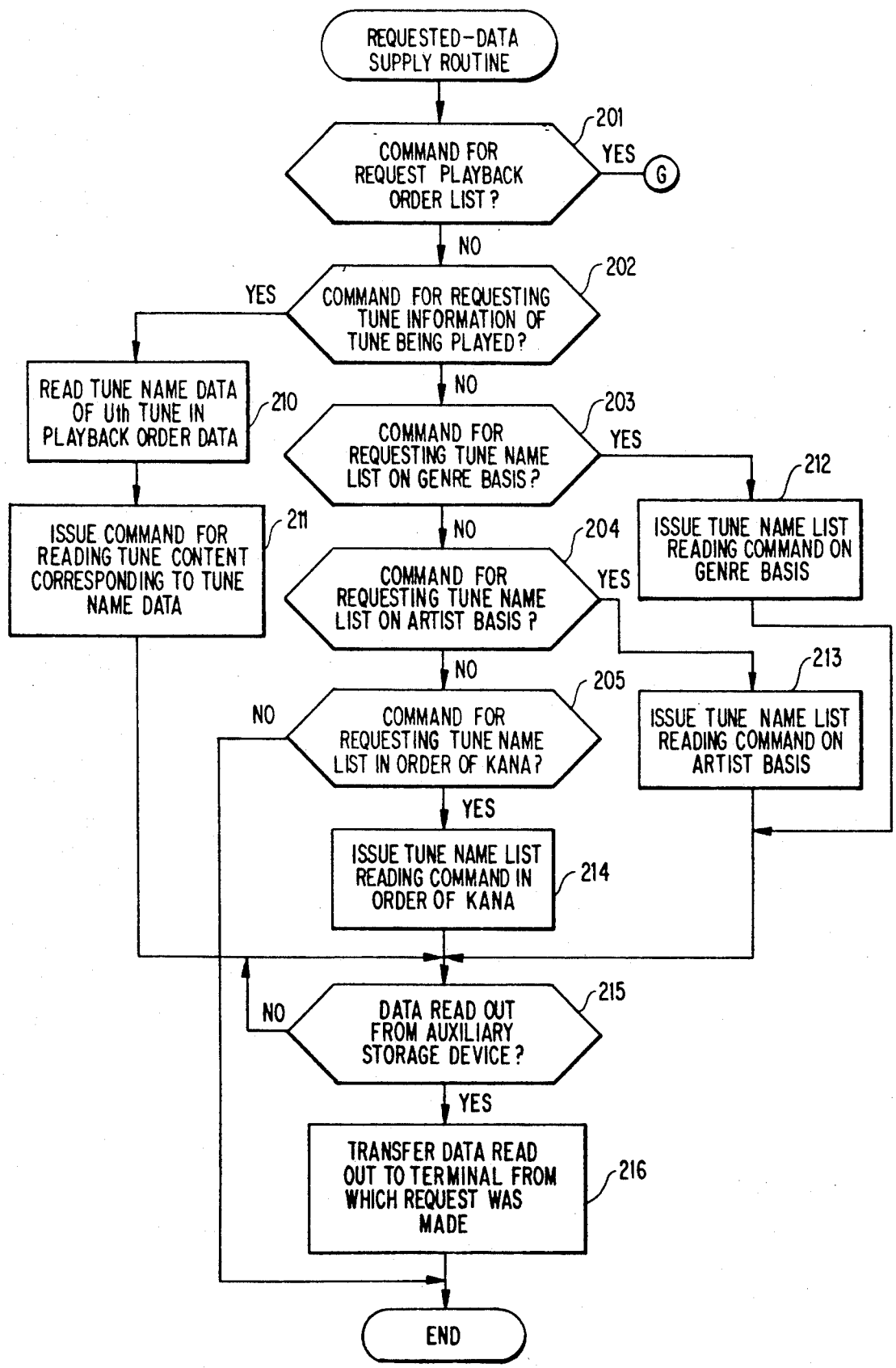

|  | TUNE NAME DATA | REQUEST PERSON DATA |
|---|---|---|
| FIRST TUNE | $DA\ 1_1$ | $DB\ 1_1$ |
| SECOND TUNE | $DA\ 1_2$ | $DB\ 1_2$ |
| THIRD TUNE | $DA\ 1_3$ | $DB\ 1_3$ |
| ⋮ | ⋮ | ⋮ |

FIG. 11

| SPECIFIED TERMINAL NUMBER |
|---|
| n−7 |
| n−3 |
| n−1 |
| ⋮ |

FIG. 12

| PRIORITY | PLAYBACK PRIORITY TERMINAL NUMBER |
|---|---|
| 1 | n−8 |
| 2 | n |
| 3 | n−11 |
| 4 | n−2 |
| ⋮ | ⋮ |
| n | n−1 |

FIG. 13

| PLAYBACK ORDER | TERMINAL NUMBER | TUNE NAME DATA | REQUEST PERSON DATA |
|---|---|---|---|
| 1 | n−8 | DA n−8$_1$ | DB n−8$_3$ |
| 2 | n | DA n$_1$ | DB n$_2$ |
| 3 | n−11 | DA n−11$_1$ | DB n−11$_3$ |
| 4 | n−2 | DA n−2$_1$ | DB n−2$_1$ |
| ⋮ | ⋮ | ⋮ | ⋮ |

AUTOMATIC TUNE SELECTION AND PLAYBACK APPARATUS

BACKGROUND OF THE INVENTION

1. Field Of The Invention

The present invention relates to an automatic tune selection and playback apparatus for supporting a storage medium in which a plurality of tunes are stored and for selecting a tune specified by tune-specifying information.

2. Background

With a conventional automatic tune selection and playback apparatus, when inputting information representative of a desired tune, i.e., tune-specifying information, the information is inputted by operating switches or a key on a keyboard marked with numerals or alphabet thereon. Inputting requested tunes through a keyboard is a time consuming job if a large number of specified tunes or requests are requested, causing dissatisfaction to people who request playback of the tunes. Further, playback of the tunes may not be in the order in which they were requested. Also a person who makes a request may not be aware when the tune he requested will be played back. Further, when somebody other than the person who requested the tune currently being played wants to know the words of the tune, he is unable to readily determine the words. The order of playing back the requested tunes cannot be determined at the receiving side without regard to the order of receiving requests. The list of tune names that can be requested has conventionally been maintained in a book, and is subjected to wear and tear. Further the tune name list book has to be replaced by a new book when adding new tunes to increase the number of tunes that the user can request.

SUMMARY OF THE INVENTION

An object of the present invention is to provide an automatic tune selection and playback apparatus capable of efficiently accepting request-tunes even when the requests are congested.

An automatic tune-selection and playback apparatus according to the present invention includes a playback device for supporting a storage medium in which a plurality of tunes are stored, and for selecting a specified tune in accordance with a tune-specifying information to playback the selected tune; a plurality of terminal units each of which receives and stores the tune-specifying information; and a central control circuit for sequentially reading the tune-specifying information from each of the terminal units as data specific to that terminal so as to supply the playback device with the tune-specifying information.

Another object of the present invention is to provide an automatic tune-selection and playback apparatus capable of efficiently accepting request-tunes in which each person who requested a tune can determine the order of playback of the tunes.

The central control circuit decides the order of playing back requested tunes corresponding to the respective terminals units on the basis of the tune-specifying information that have been read from the terminal units and reports the order of playing back the tunes.

Still another object of the invention is to provide an automatic tune selection and playback apparatus capable of handling the request of tunes in which information on the tune currently being played back can be easily obtained. Thus, according to the invention, the apparatus further includes a display circuit provided at each terminal unit, wherein the central control circuit transfers tune information of a tune currently being played back to the terminal units, the terminal units displaying a display on the basis of the tune information of the tune currently being played back by circuit of the display means.

According to yet another embodiment of the invention, the automatic tune-selection and playback apparatus comprises a playback device for supporting a storage medium in which a plurality of tunes and a plurality of tunes including tune contents character information are stored, and for selecting a specified tune in accordance with a tune-specifying information to playback the selected tune; a plurality of terminal units each of which receives and stores the tune-specifying information; a central control circuit for sequentially reading the tune-specifying information from each of the terminal units as data specific to that terminal so as to supply the playback device with the tune-specifying information; and a display circuit provided at each terminal unit; wherein the central control circuit transfers the tune contents character information outputted from the playback device to the terminal units, the terminal units displaying a display on the basis of the contents character information by means of the display circuit.

Still a further object of the present invention is to provide an automatic tune selection and playback apparatus capable of accepting tune requests and of easily setting the order of playing back of the requested tunes. Therefore, an automatic tune selection and playback device according to the invention comprises a playback device for supporting a storage medium in which a plurality of tunes are stored, and for selecting a specified tune in accordance with a tune-specifying information to playback the selected tune; a plurality of terminal units each of which receives and stores the tune specifying information; a central control circuit for sequentially reading the tune-specifying information from each of the terminal units as a data specific to that terminal so as to supply the playback device with the tune-specifying information both in accordance with priority of the specified playback order and corresponding to the respective units.

A still further object of the present invention is to provide an automatic tune selection and playback apparatus capable of accepting tune requests in which a tune name list in the form of a book is not required. The automatic tune-selection and playback apparatus according to this embodiment of the invention comprises a playback device for supporting a storage medium in which a plurality of tunes are stored, and for selecting a specified tune in accordance with a tune-specifying information to playback the selected tune; a plurality of terminal units each of which receives and stores the tune-specifying information; a central control circuit device for sequentially reading the tune-specifying information from each of the terminal units as data specific to that terminal so as to supply the playback circuit with the tune-specifying information; and a display circuit provided at each terminal unit; wherein the central control device has a storage means for storing tune name list information, the central control means reading the tune name list information from the storage device to transfer to the respective terminal units, the terminal units displaying a display on the basis of the tune name list information.

BRIEF DESCRIPTION OF THE DRAWINGS

FIG. 2 to FIG. 4 are flowcharts for showing the operation of a microprocessor of a terminal;

FIG. 5 to FIG. 9 are flowcharts for illustrating the operation of a microprocessor in a central control unit;

FIG. 11 is a diagram for showing a specified terminal area:

FIG. 12 is a diagram for showing a playback priority area; and

FIG. 13 is a diagram for illustrating a playback order area.

DETAILED DESCRIPTION OF THE PREFERRED EMBODIMENTS

Embodiments of the present invention will now be described in detail with reference to the drawings.

Figure 1:
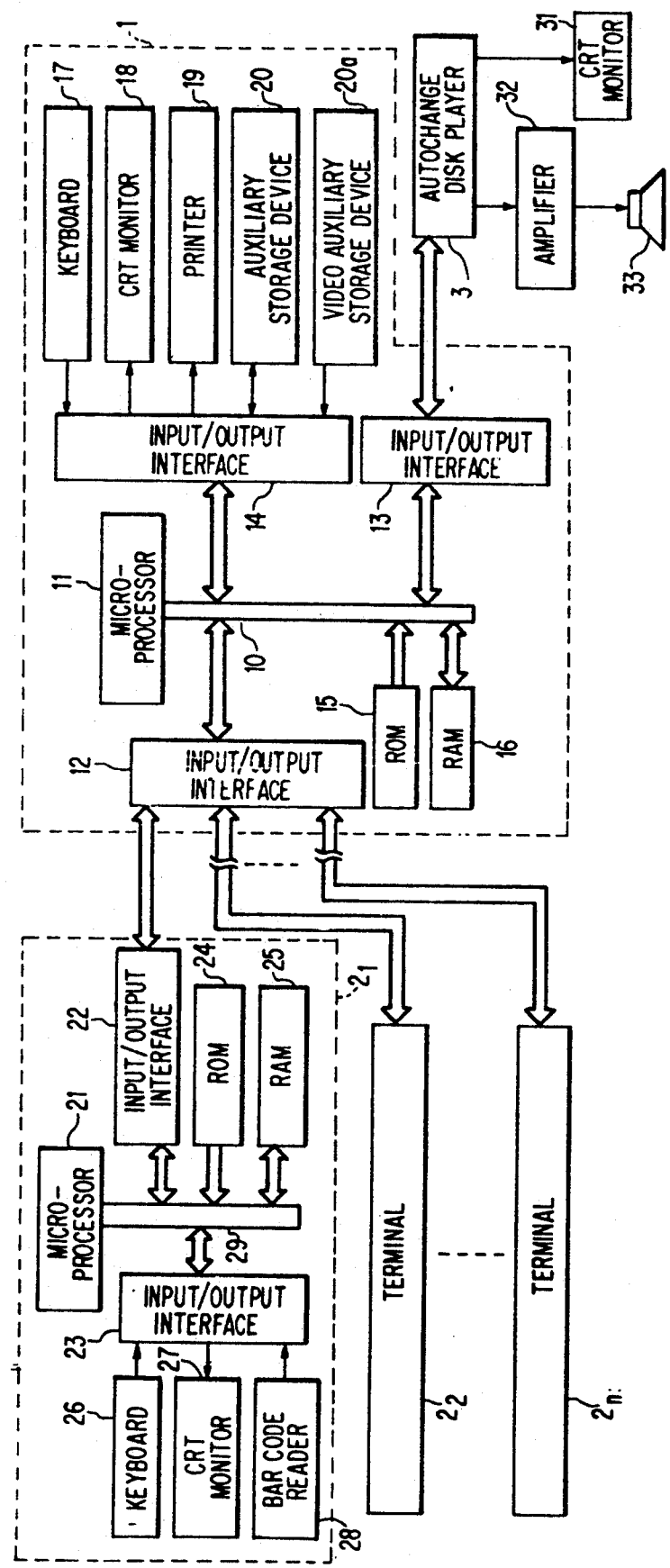
FIG. 1 is a block diagram for illustrating a general arrangement of an automatic tune selection and playback apparatus according to the present invention.

FIG. 1 shows a general arrangement of an automatic tune selection and playback apparatus according to the present invention. The automatic tune selection and playback apparatus consists of a central control unit 1, a plurality of terminals $2_1$ to $2_n$ (where n is 16, for example) and an autochange disk player 3 having a plurality of disks. The central control unit 1 is provided with a microprocessor 11 for performing digital arithmetic operation in accordance with a program, input-output interfaces 12, 13, 14, a ROM 15 into which the program is stored in advance, a request-tune area, specified-terminal area, playback priority area, a RAM 16 having a memory area such as a playback order area, a keyboard 17, a CRT monitor 18, a printer 19, and an auxiliary storage device 20 for a floppy disk driver or a CD-ROM driver etc.. and a video auxiliary device 20a for a video disk player or a VTR etc. The microprocessor 11 and the input/output interface 12. 13. 14, the ROM 15 and the RAM 16 are interconnected through an address bus and a control signal bus (both not shown). The keyboard 17 is provided with various keys such as a playback key, numeral keys, character keys, setting keys, and arrow keys (not shown) for moving a cursor on the screen of the CRT 18. The auxiliary storage device 20 is used for reading data from storage media such as the floppy disk or the CD-ROM driver etc., and a video auxiliary device 20a for a video disk player or a VTR etc. The microprocessor 11 and the input/output interface 12, 13, 14, the ROM 15 and the RAM 16 are interconnected through an address bus and a control signal bus (both not shown). The keyboard 17, the CRT monitor 18, the printer 19, the auxiliary storage device 20 and the auxiliary video storage device 20a are connected to the input/output interface 14. The keyboard 17 is provided with various keys such as a playback key, numeral keys, character keys, setting keys, and arrow keys (not shown) for moving a cursor on the screen of the CRT 18. The auxiliary storage device 20 is used for reading data from storage media such as the floppy disk or the CD-ROM in which the tune data such as a list of various tune names and words thereof are stored, and for storing into the storage medium "usage data" indicative of, for example, the names of the tunes actually played back by the autochange disk player 3 and the number of times in which each tune has been played back. The video auxiliary storage device 20a is a storage device for storing picture information such as commercials other than the picture information of the requested tunes from the autochange disk player 3. The input/output interface 12 has a multiplexer function for selecting any one or a plurality of terminals from the terminals $2_1$ to $2_n$ so as to input data thereinto or output the data therefrom in response to a command from the microprocessor 11.

In the mean time the terminals $2_1$ to $2_n$ are connected to the corresponding input/output ports of the input/output interface 12. The terminal $2_1$ consist of a microprocessor of for performing digital arithmetic logic operation in accordance with the program, input/output interfaces 22, 23, a ROM 24 in which a program is stored in advance, a RAM 25 having a memory area such as request-tune area, a keyboard 26, a small CRT monitor 27, and a bar code reader 28. The microprocessor 21, the input/out interfaces 22, 23, the ROM 24 and the RAM 25 are connected to each other through a data bus 29, an address bus, and a control signal bus (both not shown). They keyboard 26, the CRT monitor 27, and the bar code reader 28 are connected to the input/output interface 23. The keyboard 26 is provided with keys, including the character keys of the alphabet or KATAKANA (phonetic characters in Japanese language). the numeral keys, the tune selection key, the tune name list request key, the request display key, the arrow key for moving the cursor on the CRT monitor 27, and a cancel key (not shown). Within the input/output interface 23 is provided a video RAM (not shown) having memory storage capability large enough for the number of characters to be displayed or video of the CRT monitor 27. The video signal in the video RAM is supplied to the CRT monitor 27 and the content of the video RAM is altered in accordance with the display data from the microprocessor 21. The terminals $2_2$ to $2_n$ are also arranged in like manner. The terminals $2_1$ to $2_n$ are to be provided, one at each table, in a room where the automatic tune selection and playback apparatus is installed as well as other places. It should be noted that the display device may be a liquid crystal type displayer in place of the CRT monitors 18, 27 and a later described CRT monitor 31.

The autochange disk player 3 is connected to the input/output interface 13 to perform disk selection, tune selection, and playback of the tune in accordance with the respective commands supplied from the microprocessor 11 through the input/output interface 13. The video signal from the autochange disk player 3, resulting from playback of the disk is fed to a large CRT monitor 31 while the audio signal outputted simultaneously to the output of the video signal is fed to a speaker 33 through an amplifier 32. With an automatic tune selection and playback apparatus of such an arrangement, each of the terminals $2_1$ to $2_n$ receives the requested tune or tune-specifying information and stores the information into the RAM 25. In the meantime, the central control unit 1 reads the request tunes stored in the RAM 25 at the respective terminals $2_1$ to $2_n$ in a predetermined order, and controls the autochange disk player 3 in the order of playback determined through a later described procedure to thereby handle the requests.

The operation of the terminal $2_1$ will now be described in accordance with the operation flow of the microprocessor 21.

Figure 2B:
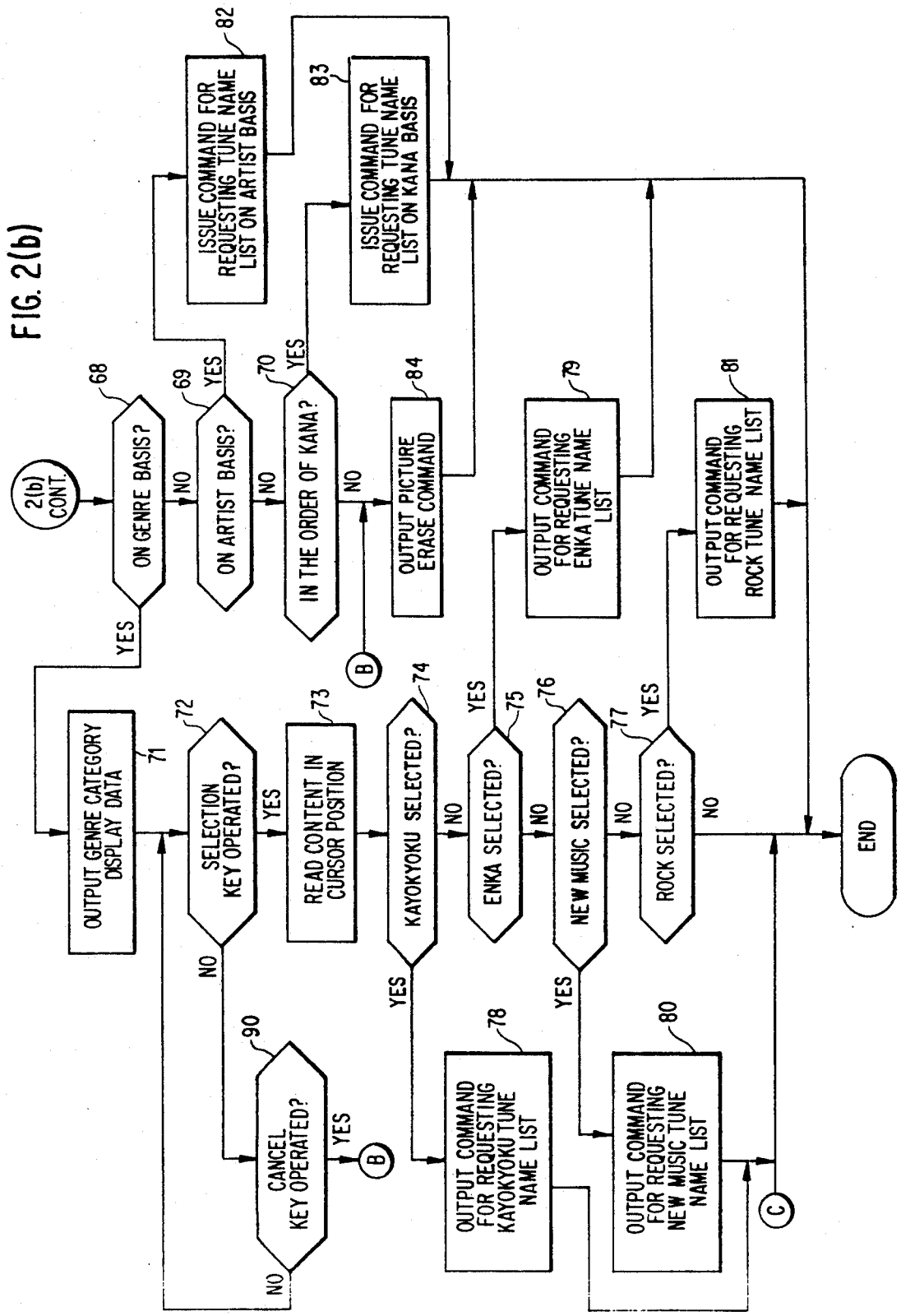
Figure 2C:
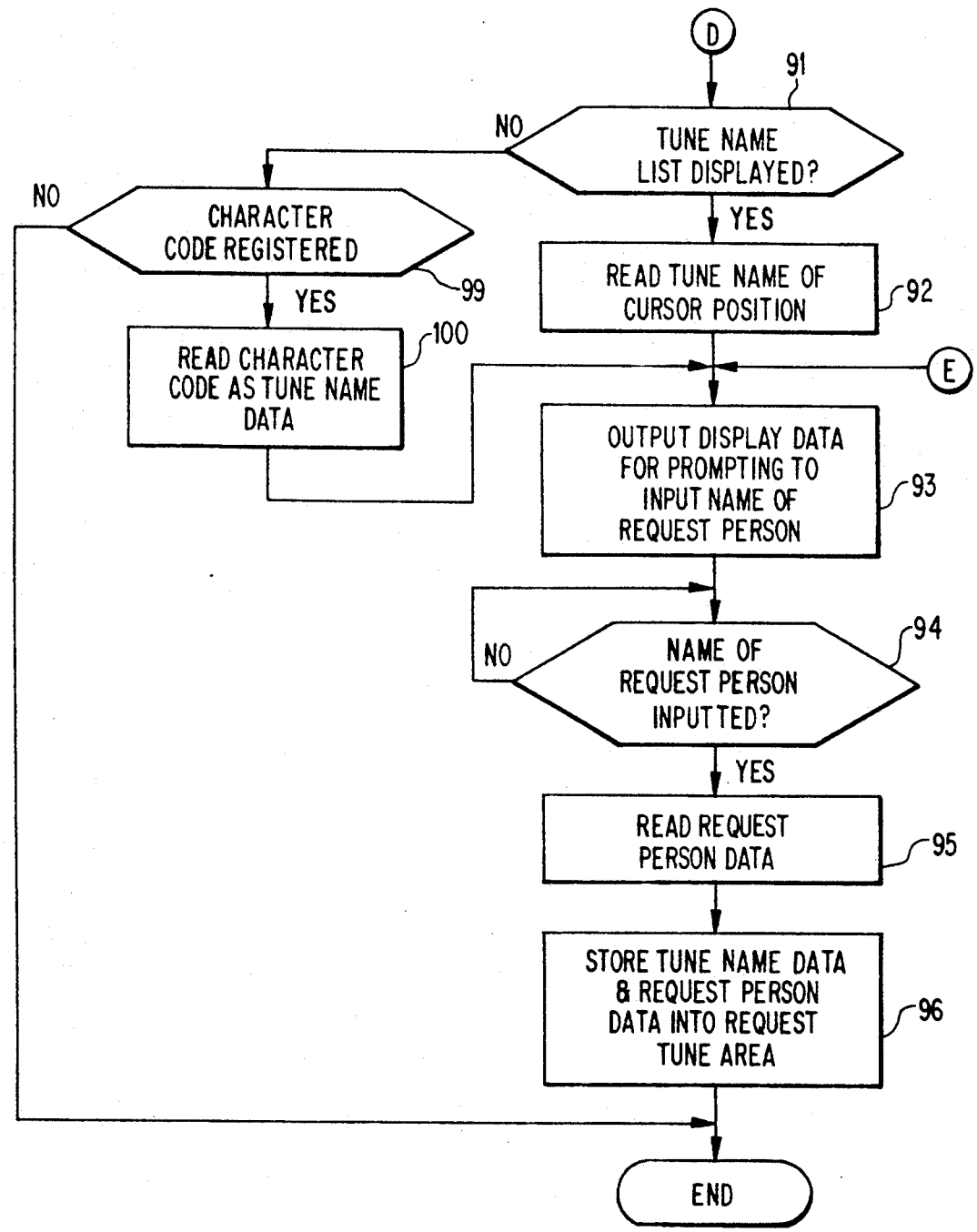

The microprocessor 21 carries out an operation-input routine and a data-reading display routine in a repeated manner. In the operation-input routine, as shown in FIG. 2a to FIG. 2c, a decision is made based on whether or not a key on the keyboard 26 has been operated (step 51). If the keys have been operated, then a decision is made based on whether or not the key operation was on the data-display requesting key (step 52): if not, a decision is made based on whether or not the key operation was on the character key (step 53). If it is not on the character key, then a decision is made based on whether or not the key operation was on the selection key (step 54); if it is not on the selection key a decision is made based on whether or not the key operation was on the request display key (step 55). For example, when a key on the keyboard 26 is operated a code that has been pre-assigned to the key is registered in an input buffer (not shown) within the input/output interface 23 in the order of the key operation. Thus a key actually operated can be determined from the code. Thus, if the operated key is the data-display requesting key, then the predetermined data-category display data is outputted to the input/output interface 23 for prompting the user to input a data category (step 57). The input/output interface 23 feeds a video signal to the CRT monitor 27 in accordance with the predetermined data-category display data, thereby indicating which one is to be specified: "1. tune name list", "2. information on the tune presently being played back", or "3. order of playing the requested tunes" on the CRT monitor 27. At the same time, a display is displayed for prompting the user to select any one of these three by means of the arrow keys. Thus a decision is made based on whether or not the selection key has been operated (step 58). If the selection key has been operated then the CPU reads out the content corresponding to the cursor position (step 59) to decide which one has been selected: the tune name list, the information on the tunes presently being played, or the order of playing back the requested tunes (step 60 to step 62). If the tune name list has been selected then the CPU proceeds to step 65. If the information on the tune currently being played has been selected, then the CPU outputs a command for requesting the tune information of the tune currently being played (step 63); if the order of playing back the requested tunes has been selected, the CPU outputs a command for requesting a list of order of playing back the requested tunes (step 64). This order of playing back the requested tune is the order of the tunes to be played back and does not include the order of the tunes that have been played back already. Also, the data category may include not only the aforementioned tune name list but also a data category such as "top ten" of the requests.

If the tune name list has been selected, then the CPU outputs a predetermined list category display data to the input/output interface 23 to thereby prompt the user to specify the list category (step 65). The input/output interface 23 supplies the CRT monitor 27 with a video signal in accordance with the predetermined list category display data, thereby displaying any one of: "1. genre", "2. artist", "3. in the order of KANA (phonetic symbols of Japanese language):", and "4. cancel". A display is displayed for prompting the user to choose one of these four by operating the arrow keys to move the cursor and then to operate the selection key.

Thus a decision is made based on whether or not the selection key has been operated (step 66). If the selection key has been operated, then the content corresponding to the cursor position is read in (step 67) to thereby make a decision based on whether or not any one of "genre", "artist""in the order of KANA", or "cancel" has been operated (step 68 to 70). If genre has been selected then the CPU outputs a predetermined genre category display data to the input/output interface 23, prompting the user to specify the genre category (step 71). The input/output interface 23 supplies the CRT monitor 27 with a video signal in accordance with the predetermined genre category display data, prompting the user to specify the type of music: "1. KAYOKYOKU" or popular song, "2. ENKA" or popular love song; "3. new music", "4. Rock". A display is displayed for prompting the user to choose one of these four by operating the arrow keys to move the cursor and then to operate the selection key. Thus a decision is made based on whether or not the selection key has been operated (step 72); if the selection key has been operated, then the CPU reads the content corresponding to the cursor position (step 73) and decides which one of the genre was selected KAYOKYOKU, ENKA, new music, or Rock (step 74 to 77). Then the CPU outputs a command for asking the user a tune name list of any one of the genre, "KAYOKYOKU", "ENKA", "new music", and "Rock" depending on the result at step 74 to 77 (step 78 to 81).

If the "artist" has been selected, then the CPU outputs a command for requesting the "tune name list on an artist basis" (step 82); if the selection was "in the order of KANA", then the CPU outputs a command for requesting "tune name list in the order of KANA" (step 83). if the selection is none of the above three, i.e., "cancel", then the CPU outputs a picture erase command (step 84). The commands for requesting the tune name list are outputted from the respective terminals to the input/output interface 12 through the input/output interface 22. These commands are read in by means of a later described interrupt operation, by a microprocessor 11 in the central control unit 1. The picture erase command is outputted to the input/output interface 23 to erase all the display on the CRT monitor.

If the selection is on the basis of the artist, then the procedure may be arranged to prompt the user to specify an artist by inputting a character(s) indicative of that artist, thereby outputting the command for requesting the tune name list of that artist. Alternatively, if the selection is "in the order of KANA" the procedure may be arranged to prompt the user to specify any one of the KANA symbols "A, I, U, E. . . . . .", thereby outputting a tune name list corresponding to the symbol.

Also the selection on the basis of genre may not be limited to the aforementioned KAYOKYOKU etc., but may be others such as tango, chanson, or jazz.

If the selection key has not been operated at step 66, then a decision is made based on whether or not the cancel key has been operated (step 85). If the cancel key has been operated, then the CPU proceeds to step 84; if not, to step 66 to make a decision on the selection key, which also applies to steps 89 and 90. The flowchart may be modified in such a way that the CPU returns to step 57 when the cancel is specified or the cancel key is operated.

At step 53, if the character key has been operated, then the CPU reads the code in the input buffer within the input/output interface 23 (step 87) and outputs the display data to the input/output interface so as to display the input characters on the CRT monitor 27 (step 88). Thus every time the character key on the keyboard 26 is operated, a character corresponding to that key operated is displayed in sequence from a predetermined position on the CRT 27.

Figures 9B, 10:
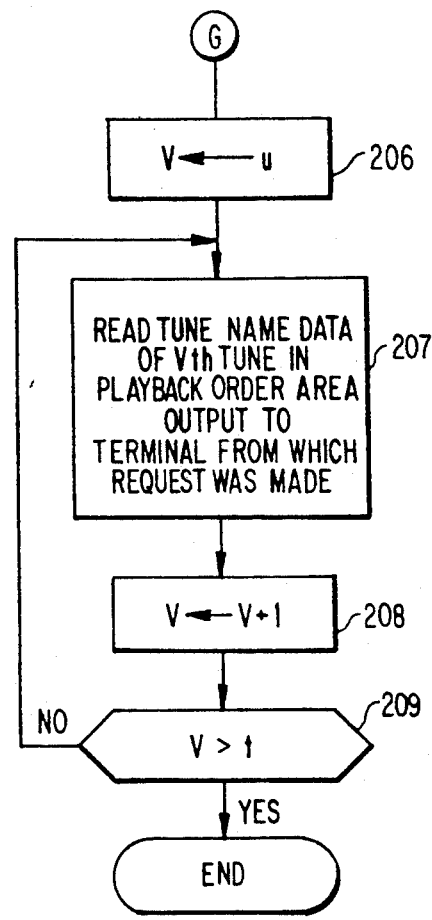
FIG. 10 is a diagram for showing a request tune area in the terminal.

If the selection key is determined to have been operated at step 54, then a decision is made based on whether or not the tune name list is being displayed (step 91). If the tune name list is being displayed, then the CPU reads the current tune name indicated by the cursor on the CRT monitor 27 by determining that this tune was selected (step 92). and then outputs a display data for prompting the user to input the name of a person who requested the tune as a tune-requesting person information to the input/output interface 22 (step 93). Thereafter a decision is made whether or not the name of tune requesting person is inputted (step 94). A display "name of a tune-requesting person ?" is displayed at a portion other than the tune name display area or in a window on the CRT monitor 27 prompting the user to input the name of tune-requesting person, then the user inputs the name of the tune-requesting person using the character key and finally operates the selection key. The character corresponding to the character key operated is displayed on the CRT monitor 27 as in step 88 and disappears together with the aforementioned display "name of a tune-requesting person ?" upon operation of the selection key. If the name of the tune-requesting person is inputted, then the CPU reads the name (step 95) to store in sequence the tune name data and the tune-requesting person data into the requested-tune area defined in the RAM 25 as shown in FIG. 10 (step 96). If the tune name list is not being displayed a decision is made based on whether or not a train of character code is registered in the input buffer (step 99): if a train of character codes has been registered through operation of the character key, then the CPU reads the train of character code as a tune name data (step 100) and proceeds to step 93 to store the tune name data and the tune-requesting person data into the requested-tune area defined in the RAM 25.

In the case where the request-display key is decided to have been operated at step 55, the CPU reads all the tune name data $DA1_1$, $DA1_2$, ... stored in the requested-tune area in the RAM 25, in order beginning with the first tune, (step 97) and outputs to the input/output interface 23 the display data corresponding to the respective tune name data that are read out (step 98). Thereby the tune names currently on request are displayed on the CRT monitor 27 in the order of the requests.

In the meantime, if the key on the keyboard 26 has not been operated then a decision is made based on whether or not the bar code has been input (step 101). The bar code reader 28 reads the bar code printed on the tune name basis in the tune name list book for KARAOKE (orchestra without song therein) for example, or the bar code displayed on the screen of the CRT monitor 27 together with the tune name in the tune name list. Then the bar code that is read in is registered in a bar code input buffer (not shown). different from the input buffer for the aforementioned keyboard 26. If the bar code has been inputted, then the CPU reads the bar code as a tune name data from the bar code input buffer (step 102) and proceeds to step 93 to store the tune name data that has been read into the requested-tune area defined in the RAM 25.

The position of the cursor is controlled by means of the arrow keys in accordance with arrow-key operation.

Then, as shown in a data reading display routine in FIG. 3, the microprocessor 21 makes a decision based on whether or not the data has been supplied from the central control unit 1 (step 111). If the data has been supplied from the central control unit 1, then the CPU reads the data (step 112) to make a decision based on whether the data is the tune name list data, the content of a tune currently being played, a requested tune playback order data or a memory cancel data (step 113 to 116). If the data is the tune name list data, then it is stored in the predetermined area in the RAM (step 117) and the tune name list data is outputted as a display data to the input/output interface 23 so as to display the tune name list on the CRT monitor 27 (step 118). Thus, the CRT monitor 27 displays the requested tune name list which can be scrolled by means of the arrow key operation. If the data is the content of the tune presently being played back, then the tune content data currently being played back is outputted as a display data to the input/output interface 23 (step 119). Thus the words and video etc. of the tune being played are displayed on the CRT monitor 27. If the data is the requested-tune play order data, then the data is outputted as the display data to the input/output interface 23 (step 120). Thereby the present requested-tune play order is displayed on the CRT monitor 27. If the data is the memory cancel data which indicates that a tune was played in response to the request the first tune in the requested tune area in the RAM 25 is erased and the remaining tunes are advanced by one tune (step 121). That is, the order of the requested tunes is advanced successively erasing the tune name data $DA\ 1_1$ and the request person data $DB\ 1_1$ and then advancing $DA1_2$ to $DA1_1$ and $DB\ 1_2$ to $DB\ 1_1$ and so on.

When the request-reading command is supplied from the central control unit 1, the microprocessor 21 halts operation of processing the routine currently being processed so as to enter the interrupt routine process. In this interrupt process, a decision is made based on whether or not the tune name data has been stored in the request area of the RAM 25 as shown in FIG. 4 (step 131); if not stored, then a non-request data is outputted to the central control unit 1 through the input/output interface 22 (step 132). If the tune name data has been stored in the request area, then the CPU reads the tune name data and the request person data successively, starting with a first tune (step 133). and supplies sequentially the central control unit 1 with the tune name data and the request person data together with the terminal number data as a set of request data through the input/output interface 22 (step 134).

Then a decision is made based on whether or not a predetermined number A (e.g., 2) of the request data have been outputted (step 135): if the predetermined number A of the request data have not been outputted, then the CPU returns to step 114 to read the next tune name data and the request person data. Once as many data as the predetermined number A have been outputted, the CPU returns to the routine that had been carried out before being interrupted. When this tune name data and request person data are outputted to the central control unit 1, the central control unit 1 is informed of the initialization of data transmission and transmission of the data by means of a control signal. If the number of requested tunes is less than the predetermined number A, then as many number of tunes as available is outputted.

Although description of operation has been made about the terminal $2_1$, similar operation applies to the terminals $2_2$ to $2n$.

Figure 5C:
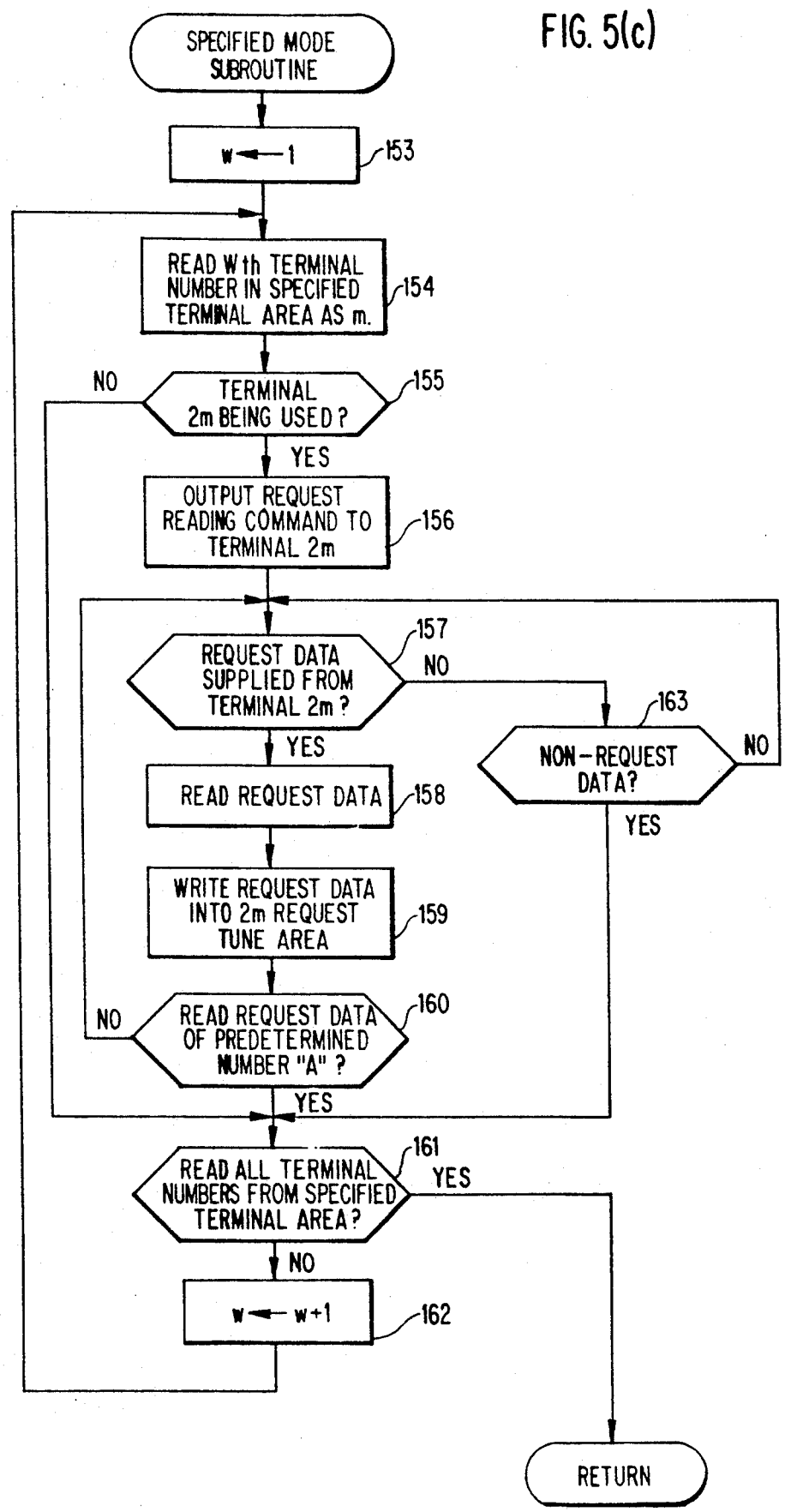

The operation of the central control unit 1 will now be described in accordance with flowchart of the microprocessor 11. The microprocessor 11 repeatedly carries out routines such as a request reading routine, a request playback priority setting routine, a request playback order determining routine, a playback routine, and a request data output routine. With the request reading routine which is carried out at a predetermined time interval, as shown in FIG. 5a to FIG. 5c, a decision is made based on whether or not the terminal number has been stored in the specified-terminal area defined in the RAM 16 shown in FIG. 11 (step 136); if stored, then a decision is made based on whether or not a variable x equal to 0 (step 137). The variable x is set to an initial value and varies by being set or calculated as will be described later. If $x=0$, then the CPU reads a frequency y indicating the number of carrying out the specified mode in which the requests are read only from the specified terminal (step 138) and x is then assigned the content y (step 139). The frequency y may be read and stored into a predetermined area in the RAM 16 at the same time that the terminal number is inputted for storage into the specified terminal area. After execution of step 139, a decision is made based on whether or not the variable is equal to 1 (step 140). If x is not equal to 0, then step 140 is carried out immediately; if $x=1$ then a normal mode subroutine for reading the request from all the terminals $2_2$ to $2_n$ is carried out (step 141): if x is not equal to 1, then the specified mode subroutine is carried out (step 142).

In the normal subroutine, a variable m is set to 1 (step 143), and a decision is made based on whether or not the terminal $2_m$ is being used (step 144). The term "terminal being used" represents, for example, a condition that the power of supply of terminal $2m$ is turned on; the respective terminals $2_1$ to $2_n$ are set "being used" or "not being used" by the user's key operation on the side of the central control unit 1. If the terminal $2m$ is being used, then the CPU outputs a request-reading command to the terminal $2m$ (step 145). The request-reading command is supplied to the input/output interface 12 and is then supplied to the input/output interface of the terminal $2m$ (if terminal $2_1$ then to the input/output interface 22) with the aid of the control signal. After the request-reading command is provided, a decision is made based on whether or not request data consisting of the terminal number data, the tune name data, and the request person data is supplied from the terminal $2m$ (step 146); if the request data has been supplied, then the CPU reads the request data (step 147), and writes it into the $2m$ requested-tune area of the RAM 16 (step 148).

Then a decision is made based on whether or not all of the predetermined number A of the requested data supplied from the terminal $2m$ is read in (step 149); if all the data has been read in, then the variable m is added 1 (step 150). If the request data data is not supplied from the terminal $2m$, then a decision is made based on whether or not the non-requested data has been supplied (step 151); if the non-requested data has been supplied, then the CPU proceeds to step 150. After adding 1 to the variable m at step 150, a decision is made based on whether or not the variable m is greater than the number of terminals n (step 152): if $m \leq n$, then the CPU proceeds to step 144, if $m > n$ then the request reading routine, the $2_1$ to $2_n$ request tune areas in the RAM 16 will be written as data, respectively up to as many requested tune names and request person names as the predetermined number A at the maximum. The $2_1$ to $2_n$ request tune areas in the RAM 16 are formed in a manner similar to the terminals $2_1$ to $2_n$ in the RAM 25 and are adapted to store the terminal numbers as well.

In the specified-mode subroutine, a variable w is set to 1 (step 153), then the CPU reads as a number m the w-th terminal number stored in that terminal area (step 154), then proceeds to step 155. The steps 155 to 160 are of the same steps as steps 144 to 149. If all the request data supplied from the terminal $2_m$ have been read at step 160, a decision is made based on whether or not all the terminal numbers stored in the specified terminal area have been read (step 161): if all the terminal numbers have not been read yet, then the variable w is added 1 (step 162) and the CPU returns to step 154. When all the terminal numbers stored in the specified-terminal area have been read out, the specified-mode subroutine is terminated. If the request data is not determined to have been supplied from the terminal $2m$ at step 157, then a decision is made based on whether or not the non-request data has been supplied (step 163); if the non-request data has been supplied, then the CPU proceeds to step 161.

In the specified mode, while the request data has been stored in the respective terminals $2_1$ to $2_n$, the request tune name and the request person name will not be written into the $2_1$ to $2_n$ request tune areas in the RAM 16 if it is not a specified terminal. After carrying out the normal mode subroutine or the specified-mode subroutine, the variable x is subtracted 1 (step 164) and then the routine is terminated.

For example, if the frequency y that has been read in is of 1, then $x=1$. Thus the normal mode is carried out to read the requests from all of the terminals $2_1$ to $2_n$. If the frequency y that has been read in is of 1, then $x=2$. The request will be read from the terminal unit having a specified terminal number in the specified mode in the first process cycle. Then $x=1$ in the next process cycle, the request are read from all of the terminals $2_1$ to $2_n$ in the normal mode, then $x=0$ in the next process cycle and the frequency y is again read in. Thus reading the request data in the specified mode will increase the frequency in which the requested tune is played.

Writing the terminal numbers into the specified terminal area and the frequency y into the predetermined area in the RAM 16 is effected by operating the key board 17. For example, when a required key operation is performed, the microprocessor 11 causes the CRT 18 to display thereon a predetermined number of "specified terminal number: ?", and "frequency: ?", prompting the user to input the terminal number into the space designated "?" using the numeral keys. Then the microprocessor 11 will write, through operation of the setting key, the terminal number into the specified terminal area and the frequency into the predetermined area. The frequency is supposed to be an integer greater than 1 and is automatically set to 1 if the frequency is not inputted. The decision based on whether or not the terminal $2m$ is being used may be omitted and the terminal $2m$ may be regarded to be "not-used" if the request data is not sent therefrom or the terminal will respond to the request reading command. The normal mode and the specified mode do not have to be automatically selected but may be specified through the key board 17 of the central control unit 1.

Figure 6:
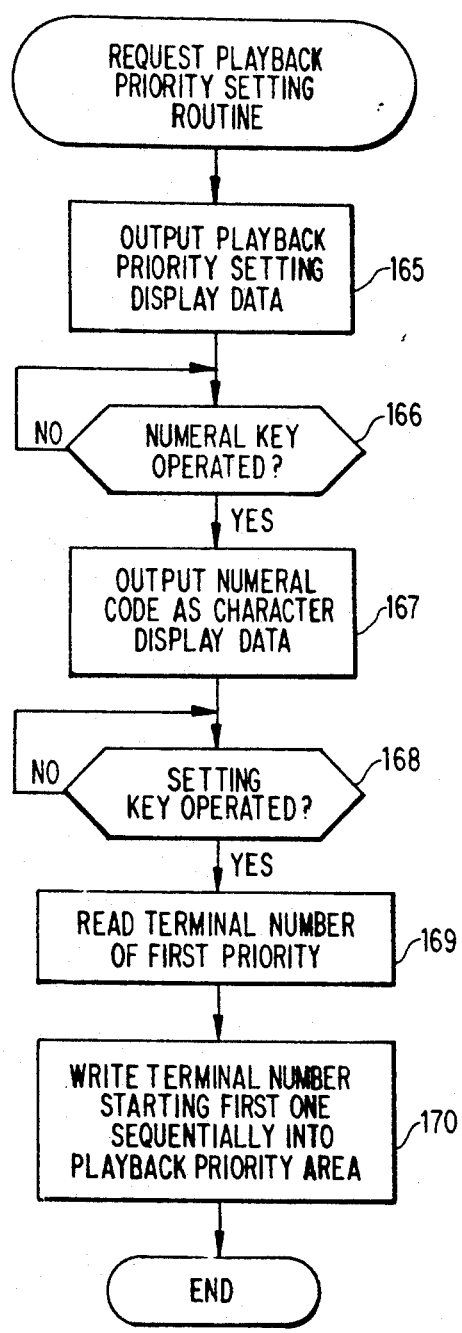

The request playback priority setting routine is carried out upon interruption through setting-key operation of the key board 17. In the request playback priority setting routine playback priority setting display data is outputted to the input/output interface 14 for requesting an operator to specify priority of the request-playback as shown in FIG. 6 (step 165). The input/output interface 14 supplies a CRT monitor 18 with the video signal corresponding to the playback priority setting display data to display "priority 1: ?", "priority 2: ?". . . etc. on the CRT monitor 18. By operating the numeral-keys of the key board 17, the operator inputs one of the terminals $2_1$ to $2_n$ into the "?" area, request of which one terminal is demanded a priority. The priority level does not have to be given to all the terminals $2_1$ to $2_n$ but may be given to terminals which should be given priority. Thus a decision is made based on whether or not the numeral-key has been operated (step 166); if operated, then a numeral code corresponding to that particular key is read in and is outputted as a character display data to the input/output interface 14 (step 167). Thereby the numeral corresponding to the numeral-key operated is displayed as a terminal number of that terminal request through which should be played back with a priority in the area of "?" of the CRT monitor 18. Then a decision is made based on whether or not the setting-key has been operated (step 168); if operated, the CPU reads the first one of the respective terminal data that are given priority (step 169) so as to write into the playback priority area defined in the RAM 16 as shown in FIG. 12 (step 170).

Therefore, by processing the playback priority setting routine, the terminal numbers are stored in the order of the given priority into the playback priority area of the RAM 16 while the terminals that are not given priority are stored in the order of the request. The playback priority area is initialized in the order of either terminal number or issued request if the request priority setting routine is not processed. The playback priority setting routine may be adapted to be terminated upon detection of operation of the cancel key at steps 166 and 168.

Figure 7:
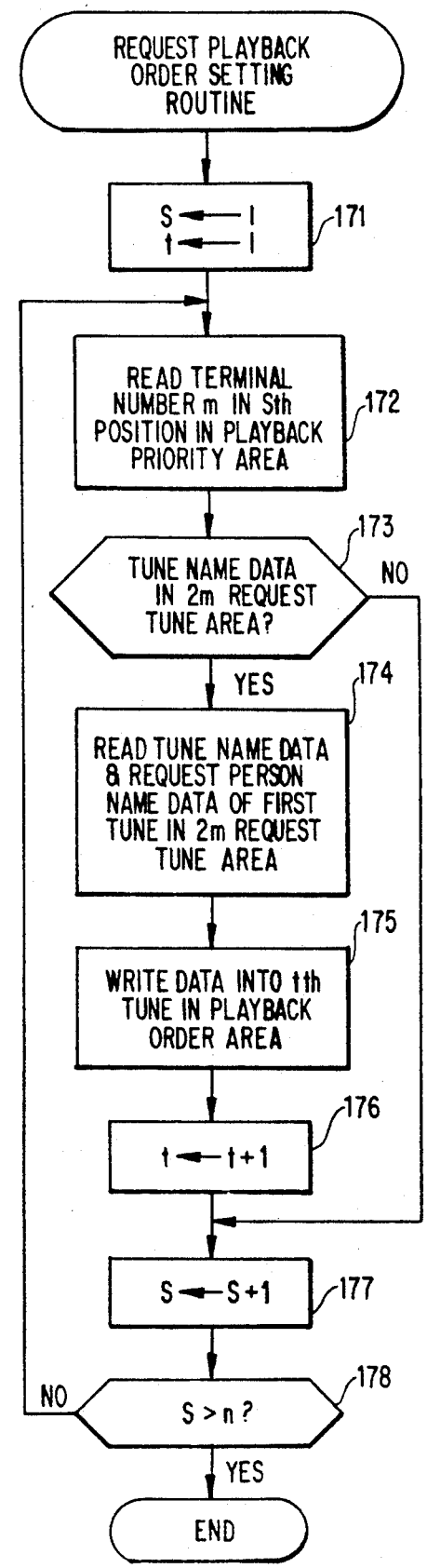

In the request playback order setting routine as shown in FIG. 7 both a variable s and a variable t are set to 1 (step 171) and then an s-th terminal number is read as m (step 172). Thereafter a decision is made based on whether or not the request tune name data has been written into the request tune area (step 173). In other words, as shown in FIG. 12, if the terminal number of the first priority is n−8, then m=n−8. If the request tune name has been written into 2m request area, then the CPU reads the tune name data and the request person data of the first tune in the 2m request tune area (step 174) to write it together with the terminal number data into the location of the t-th tune in the playback order area defined in the RAM 16 (step 175). Thereafter the variable t is added 1 (step 176) and the variable is added 1 (step 177). If the request tune name has not been written in the 2m request tune area, then the CPU immediately proceeds to step 177. After step 177, a decision is made based on whether or not the variable s is greater than the terminal number n (step 178); if s≦n, then the CPU returns to step 172, if s>n, then the request playback order setting routine is terminated. By carrying out this request playback order setting routine, the requested tunes of as many as t in total are written into the request playback order area. Although the request playback order setting routine is adapted to be processed every time the request reading routine is carried out, it may also be arranged to be processed immediately after the request playback priority setting routine has been carried out. Also if s>n and the number t of the requested tunes that have been written into the playback order area is less than a predetermined number of tunes, the tune name data and the request person data of the second tune in the 2m request tune area may be read and be written into the playback order area. In this manner, the playback order may be arranged in the order of the request, in a random order, or in the order of the desired priority.

Figure 8:
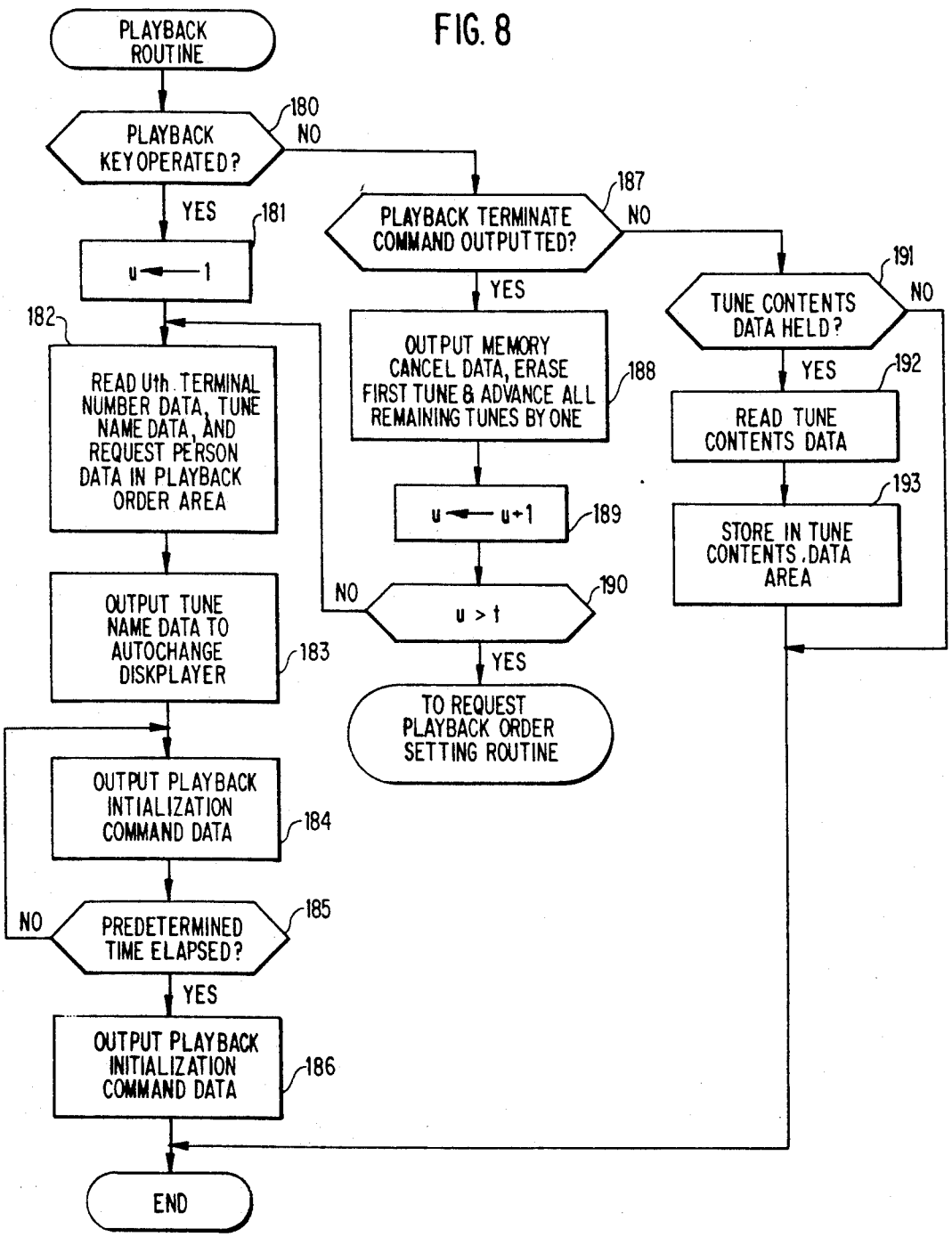

Then in the playback routine, as shown in FIG. 8, a decision is made based on whether or not the playback key on the keyboard 17 has been operated (step 180): if operated, then a variable u is set to 1 (step 181) to read the terminal number data, the tune name data, and the request person data of a u-th tune from the RAM 16 (step 182). Thereafter, the CPU supplies the autochange disk player 3 with the tune name data that is read (step 183). and then provides the terminal of a terminal number that is read with the playback initialization command data (step 184). The playback initialization command is fed to the terminal unit having the terminal number that is read from the input/output interface 12 and, as mentioned above, the next tune to be played and the name of a request person are displayed on the CRT monitor 27 at the terminal to which the terminal number is supplied so as to prompt the person to get ready to sing. After execution of step 184, a decision is made based on whether or not a predetermined time has elapsed (step 185) and step 184 is executed until the predetermined time elapses. This predetermined time interval is longer than the playback initialization preparatory time required by the autochange disk player 3. When the predetermined time has passed, a playback initialization command is produced (step 186) to the autochange player 3, and thereafter the routine is terminated. If the playback key has not been operated at step 180 a decision is made based on whether or not the playback terminate command has been supplied from the autochange disk player 3 (step 187). If the playback terminate command has been supplied the aforementioned memory cancel data is outputted to the terminal unit having the terminal number for which that tune has just been played while also erasing the first tune having that tune number in the RAM 16 and advancing one step the remaining request order in the RAM 16 (step 188). Then the variable u is added 1 (step 189), and a decision is made based on whether or not the variable u is greater than the variable t, i.e., the number of tunes stored in the playback order area (step 190). If u≦t, the CPU proceeds to step 182; if u>t, then the CPU terminates the playback routine to proceed to the request playback order setting routine. Additionally, the tunes that have been played back may be stored together with the playback order into the auxiliary storage device 20.

With the autochange disk player 3, when the tune name data is supplied as the tune-specifying information from the central control unit 1, a disk in which the tune represented by the tune name data is selected from a storage area and is placed on a playback position then a pickup (not shown) moves from its rest position to the beginning position of the requested tune on the disk. When the playback initialization command is supplied from the central control unit 1, the disk rotates and the pickup reads music information of the tune, for example optically, to provide a video signal, two-channel audio signal and a tune contents data signal including character information of tune contents at a reproduction and processing circuit (not shown). The video signal is supplied to the CRT monitor 31 which displays the words and the picture of the requested tune while the audio signal is supplied to a speaker device 33 through an amplifier 32 to thereby transmit the melody of the requested tune in the room. Then when the playback of the requested tune is completed, the playback terminate command is provided to the central control unit 1 to stop rotation of the disk to return the pickup to the rest position, and then to return the disk to the storage area thereof.

The tune contents data signal is supplied to an input buffer (not shown) in the input interface 13 to be held temporarily. A decision is made by the microprocessor 11 based on whether or not the tune contents data is held in the input buffer during the playback operation (step 191). If the tune contents data is held it is read into the microprocessor 11 (step 192), to be stored in a data area of tune contents (not shown) in the RAM 16 (step 193).

The disks used include not only those manufactured with the character information such as words of the tunes being superimposed to the picture information but also those having the picture information and the character information separately. Using the latter permits complicated transmission where only verbal information of the tune or picture information containing verbal information therein is transmitted to the terminal at which the request person is located, while transmitting to the other terminals the picture information without the verbal information being attended. In other words, either verbal information only, picture information only or both the verbal information and the picture information can be transmitted at will depending on the terminals from the central control unit 1 to be displayed.

The requested-data supply routine is a routine that is entered upon interrupt when the respective requesting command are supplied as shown in FIGS. 9a and 9b. With the requested-data supply routine, when the respective requesting command is supplied, a decision is made based on whether or not the requesting command is the command for requesting the request playback order list, the command for requesting the tune information of the tune currently being played back, the command for requesting the tune name on the artist basis, or the command for requesting the tune name list in the order of KANA (step 201 to 205). If the requesting command is the command for requesting the request playback order list, then the content of the variable v is set equal to the content of the variable u (step 206). a v-th tune name data is read out from the playback order area in the RAM 16 and outputted to the terminal from which the tune is requested (step 207). the variable v is added 1 (step 208). and a decision is made based on whether or not the variable v is greater than the numeric value t (step 209). If $v \leq t$, then the CPU proceeds to step 207; if $v > t$, then processing of the requested-data supply routine is terminated. Thus the request playback order data including the tune name data together with the tune name currently being played is supplied to the terminal from which the requesting command is issued so as to display the request playback order on the CRT monitor of that terminal.

If the requesting command is the command for requesting the tune information of the tune currently being played then the u-th tune name data is read out from the playback order are in the RAM 16 (step 210) to provide the auxiliary storage device 20 with the command for reading the tune content data such as words for the tune name data (step 211). If the requesting command is the command for requesting the tune name list, then the CPU issues the tune name list reading command on the genre basis of KAYOKYOKU, ENKA, new music, and rock n roll, the command for requesting the tune name list on an artist basis, and the command for requesting the tune name list in the order of KANA to the auxiliary storage device 20 (step 212 to 214). The auxiliary storage device 20 reads and outputs the tune content data or the tune name list data from the storage medium in response to these reading commands. Thus, the microprocessor 11 makes a decision based on whether or not the auxiliary storage device 20 has read in and outputted the tune content data or the tune name list data (step 215). and when the data has been read and output, the CPU transfers the data to the terminal from which the reading command is issued (step 216). If the tune content data and the tune name list data are to be outputted to the terminals $2_1$ to $2_n$, the CPU informs the terminals $2_1$ to $2_n$ of the start of data transmission by means of control signal.

The picture auxiliary storage device 20a corresponds to the erasable storage medium and the storage medium exclusive for reproduction, and transmits the picture information to the CRT monitor 27 or the CRT monitor 31 of the respective terminals $2_1$ to $2_n$ as required on the basis of the command from the microprocessor 11. Thus information (for example a message of "please request", etc.) including commercial messages or general background pictures may be displayed on the CRT 27 or the CRT 31 if some unused split time becomes available, for example, when all the requests from the terminals $2_1$ to $2_n$ have been played and the apparatus is in a waiting condition or when replacing the disks of the autochange disk player 3.

In the embodiment thus far described, the central control unit 1 reads out the tune name list data from the auxiliary storage device 20 in response to the tune name list reading command from the respective terminals $2_1$ to $2_n$ and then the central control unit 1 transfers the tune name list data to the terminal from which that reading command is issued. However, the invention may also be embodied in such a way that all the tune name list data is transferred into the RAM of all the terminals $2_1$ to $2_n$ for storage, and the tune name data may be read out from the RAM to display in response to the command for requesting display of the tune name list through the key operation.

In the thus far described embodiment the central control unit 1 and the terminals $2_1$ to $2_n$ communicate with each other through, for example, a cable but the communication may also be made through a radio transmit and receive system provided between the central control unit 1 and the terminals $2_1$ to $2_n$.

The central control unit 1 may be arranged to calculate the frequency of the request of every requested tune, or to calculate the charge for serving to the request from every terminal and then to print out the calculation result through a printer 19 or to store in the auxiliary storage device 20.

Further, the request person data need not be the name of a person who requested but may be anything, a character "A" for example, that gives more specific information than the terminal number.

In the embodiment mentioned above, the autochange disk player has been used, however, tape players such as VTR may also be used. A plurality of autochange disk players may be connected to the input/output interface 13 so as to individually operate these players.

Although the central control unit 1 and the terminals $2_1$ to $2_n$ share the task of an automatic tune selection and playback apparatus in the embodiment mentioned above, the apparatus may be arranged in a central control type where, for example, the terminal $2_1$ consists of only the key board 26, the CRT monitor 27, bar code reader 28, and the input/output interface 23, and the input/output interface 23 is connected to the input/output interface 12 in the central control unit 1, thereby all the operation is carried out under control of the microprocessor 11 in the central control unit 1.

Thus, according to the invention, an automatic tune selection and playback apparatus is provided with a plurality of terminal units for receiving independently and storing the tune specifying information, the central control unit reads sequentially the tune specifying information stored in the terminal units to supply the playback means with the tune specifying information, thereby playing the tunes specified by the tune specifying information. Thus even if the requests are congested, all the requests can be received smoothly in a short time. Providing the terminals at every table in a KARAOKE playback hall allows people to request tunes while sitting at each table without having to directly access the playback unit of the automatic tune selection and playback apparatus, thus effectively saving labor for relaying the requests.

Since the central control means determines playback order of the specified tunes corresponding to the respective terminal units on the basis of the tune-specifying information that are read in and then informs the playback order, registration of the specified tunes can be confirmed as well as the person who requested can tell how many tunes before his request is played.

The central control means transfers the tune information of the tune currently being played by the playback means to the respective terminal units, and the terminal units display a display in accordance with the tune information of the tune currently being played on the display means provided at every terminal unit, thereby easily providing information such as words of the tune presently being played at the respective terminal unit.

The playback priority is given on a terminal unit basis and the tune specifying information is supplied to the playback means in the order of terminals having given priority thus setting the order of playing the requested tunes at will to handle the requests.

The central control means reads the tune name list information from the storage means and transfers it to the respective terminal unit which displays a display based on the tune name list information on the display means provided at each terminal unit, thereby permitting the users to select the request tunes without using the tune name list book. Further, when increasing the number of tunes from which the user can select, it is only required to simply change the content in the storage means of the central control means or to add the new tunes.

What is claimed is:

1. An automatic tune selection and playback apparatus comprising:
    a playback means for supporting a storage medium in which a plurality of tunes are stored, and for selecting a specified tune in accordance with a tune-specifying information to playback the selected tune;
    a plurality of terminal units each of which receives and stores said tune-specifying information;
    a central control means for sequentially reading said tune-specifying information from each of said terminal units as a data specific to that terminal unit so as to supply said playback means with said tune-specifying information, wherein said terminal units receive and store said tune-specifying information and information indicative of a person who requests said tune.

2. An automatic tune selection and playback apparatus according to claim 1, wherein said terminal units display a display on the basis of said tune-specifying information.

3. An automatic tune selection and playback apparatus comprising:
    a playback means for supporting a storage medium in which a plurality of tunes are stored, and for selecting a specified tune in accordance with a tune-specifying information to play the selected tune;
    a plurality of terminal units each of which receives and stores said tune specifying information;
    a central control means for sequentially reading said tune-specifying information from each of said terminal units as a data specific to that terminal unit so as to supply said playback means with said tune-specifying information; wherein
    said central control means decides order of playing back requested tunes corresponding to the respective terminals units on the basis of the tune-specifying information that have been read from said terminal units and reports the order of playing back the tunes.

4. An automatic tune selection and playback apparatus according to claim 3, wherein each of said terminal units has a display means, said central control means transferring playback order information indicative of the order of playing back said requested tunes to said terminal units said terminal units displaying a display on the basis of said playback order information by means of said display means.

5. An automatic tune selection and playback apparatus according to claim 3, wherein said central control means transfers said playback order information to one of said plurality of terminal units in accordance with a playback-order-list request command outputted from said one of the terminal units.

6. An automatic tune selection and playback apparatus comprising:
    a playback means for supporting a storage medium in which a plurality of tunes are stored, and for selecting a specified tune in accordance with a tune-specifying information to playback the selected tune;
    a plurality of terminal units each of which receives and stores said tune-specifying information;
    a central control means for sequentially reading said tune-specifying information form each of said terminal units as a data specific to that terminal unit so as to supply said playback means with said tune-specifying information; an
    a display means provided at each terminal unit;
    wherein said central control means transfers a tune information of a tune currently being play back to said terminal units, said terminal units displaying a display on the basis of said tune information of the tune currently being played back by means of said display means; and wherein said central control means transfers information on a tune being played back to one of said plurality of terminal units in accordance with a tune-information request command outputted from said one of the terminal units.

7. An automatic tune selection and playback apparatus comprising:

a playback means for supporting a storage medium in which a plurality of tunes and a plurality of tunes including tune contents character information are stored, and for selecting a specified tune in accordance with a tune-specifying information to playback the selected tune;

a plurality of terminal units each of which receives and stores said tune-specifying information;

a central control means for sequentially reading said tune-specifying information from each of said terminal units as a data specific to that terminal unit so as to supply said playback means with said tune-specifying information; and a display means provided at each terminal unit;

wherein said central control means transfers said tune contents character information outputted from said playback means to said terminal units, said terminal units displaying a display on the basis of said tune contents character information by means of said display means; and wherein said central control means transfers said tune contents character information obtained from said playback means to one of said plurality of terminal units in accordance with a tune contents information request command outputted from said one of the terminal units.

8. An automatic tune selection and playback apparatus according to claim 7, wherein said terminal units receive and store said tune-specifying information and information indicative of a person who requests said tune.

9. An automatic tune selection and playback apparatus comprising:

a playback means for supporting a storage medium in which a plurality of tunes are stored, and for selecting a specified tune in accordance with a tune-specifying information to playback the selected tune;

a plurality of terminal units each of which receives and stores said tune-specifying information;

a specifying means for specifying priority of playback for each said terminal units;

a central control means for sequentially reading said tune-specifying information from each of said terminal units as a data specific to that terminal unit so as to supply said playback means with said tune-specifying information both in accordance with priority of the specified playback order and corresponding to the respective terminal units;

wherein said central control means has a selection means for selecting any one of a normal mode and a specified mode for reading said tune-specifying information from said terminal units, said central control means reading said tune-specifying information from all of said plurality of terminal units in the normal mode, and from only desired terminal units of said plurality of terminal units in the specified mode.

* * * * *